United States Patent
Wang et al.

(10) Patent No.: US 11,550,673 B2
(45) Date of Patent: Jan. 10, 2023

(54) VIRTUAL MACHINES RECOVERABLE FROM UNCORRECTABLE MEMORY ERRORS

(71) Applicant: Google LLC, Mountain View, CA (US)

(72) Inventors: Jue Wang, Redmond, WA (US); Yi Cao, San Jose, CA (US)

(73) Assignee: Google LLC, Mountain View, CA (US)

( * ) Notice: Subject to any disclaimer, the term of this patent is extended or adjusted under 35 U.S.C. 154(b) by 101 days.

(21) Appl. No.: 16/950,212

(22) Filed: Nov. 17, 2020

(65) Prior Publication Data
US 2022/0156160 A1 May 19, 2022

(51) Int. Cl.
| | |
|---|---|
| *G06F 11/00* | (2006.01) |
| *G06F 11/14* | (2006.01) |
| *G06F 9/455* | (2018.01) |
| *G06F 11/07* | (2006.01) |
| *G06F 11/10* | (2006.01) |
| *G06F 11/30* | (2006.01) |
| *G06F 11/32* | (2006.01) |

(52) U.S. Cl.
CPC ...... *G06F 11/1484* (2013.01); *G06F 9/45558* (2013.01); *G06F 11/0772* (2013.01); *G06F 11/1068* (2013.01); *G06F 11/301* (2013.01); *G06F 11/327* (2013.01); *G06F 2009/45575* (2013.01); *G06F 2009/45583* (2013.01); *G06F 2009/45591* (2013.01)

(58) Field of Classification Search
CPC ............. G06F 11/1484; G06F 11/0772; G06F 11/1068; G06F 11/301; G06F 11/327; G06F 11/0712; G06F 11/073; G06F 9/45558; G06F 2009/45575; G06F 2009/45583; G06F 2009/45591
See application file for complete search history.

(56) References Cited

U.S. PATENT DOCUMENTS

| | | | |
|---|---|---|---|
| 11,113,094 B1 * | 9/2021 | Koryakin | G06F 9/45558 |
| 2009/0144579 A1 | 6/2009 | Swanson | |
| 2010/0037097 A1 | 2/2010 | Kobayashi et al. | |
| 2014/0089725 A1 * | 3/2014 | Ackaret | G11B 20/1883 711/171 |
| 2015/0026807 A1 * | 1/2015 | Lutas | G06F 21/54 711/6 |
| 2019/0012110 A1 | 1/2019 | Okano et al. | |

(Continued)

OTHER PUBLICATIONS

KUHN. Method to handle memory errors during VM migration. Oct. 12, 2018. ip.com, West Henrieta, NY, US, 4 pages.

(Continued)

*Primary Examiner* — Joseph D Manoskey
(74) *Attorney, Agent, or Firm* — Lerner, David, Littenberg, Krumholz & Mentlik, LLP (57) ABSTRACT

The disclosed technology provides techniques, systems, and apparatus for containing and recovering from uncorrectable memory errors in distributed computing environment. An aspect of the disclosed technology includes a hypervisor or virtual machine manager that receives signaling of an uncorrectable memory error detected by a host machine. The virtual machine manager then uses information received via the signaling to identify virtual memory addresses or memory pages associated with the corrupted memory element so as to allow for containment and recovery from the error.

18 Claims, 4 Drawing Sheets

370

(56) References Cited

U.S. PATENT DOCUMENTS

2019/0369903 A1    12/2019  Tsirkin
2019/0391843 A1    12/2019  Franciosi et al.
2021/0216394 A1*  7/2021  Gadi .................... G06F 11/0727
2021/0286686 A1*  9/2021  Prasad ................ G06F 11/2094
2021/0294707 A1*  9/2021  Evans ................ G06F 9/45558

OTHER PUBLICATIONS

International Search Report and Written Opinion for International Application No. PCT/US2021/059517 dated Feb. 24, 2022. 17 pages.

Ruprecht et al. VM Live Migration At Scale. Mar. 25, 2018. Virtual Execution Environments, ACM, 2 Penn Plaza, Suite 701, New York, NY, USA, pp. 45-56, DOI: 10.1145/3186411.3186415.

International Search Report and Written Opinion for International Application No. PCT/US2021/059488 dated Mar. 11, 2022. 15 pages.

* cited by examiner

VIRTUAL MACHINES RECOVERABLE FROM UNCORRECTABLE MEMORY ERRORS

BACKGROUND

Cloud computing has impacted the way in which enterprises manage computing needs. It provides reliability, flexibility, scalability, and redundancy in a cost-effective way. It enables an enterprise to manage its information technology needs without, for instance, traditional capital investment and maintenance considerations. As more and more computing shifts to cloud systems, these systems now store, process, and output data on a scale that years ago was likely unimaginable. An effect of this shift is that memory errors that occur in the cloud, if not contained and/or recovered from, can impact customer or user experience on a scale corresponding to an enterprise's footprint on the cloud. For instance, it is not untypical that detection of an uncorrectable memory error on a host leads to shutting down of the host, resulting in abrupt termination of all hosted virtual machines (VMs). With memory sizes on the gigabyte or terabyte scale, that may impact thousands of VMs or applications that require lengthy time periods to reestablish.

BRIEF SUMMARY

Aspects of the disclosed technology may comprise methods or systems implemented in a cloud computing environment that allow for containment (e.g., protecting DMA accesses from corrupted data) and recovery from uncorrectable memory errors.

Aspects of the disclose technology may comprise a method. For instance, the method may be a method for uncorrectable memory error recovery in a cloud computing environment. The method may comprise: receiving, at a virtual machine managing manager, signaling of an uncorrectable memory error detected by a host machine; determining, at the virtual machine managing manager, one or more virtual machines associated with a corrupted memory element based on the received signaling; emulating a memory error associated with the corrupted memory element based on the uncorrectable memory error; and introducing, by the virtual machine managing manager, the emulated memory error into an operating environment of at least one of the one or more virtual machines.

Additional aspects of the method may comprise introducing the emulated memory error, comprising the virtual machine managing manager injecting an interrupt that is accepted by a virtual central processing unit (vCPU) of each of the one or more virtual machines. Further, the emulated memory error may comprise a notification that causes the at least one of the one or more virtual machines to signal the uncorrectable memory error to a guest user space. The emulated memory error may also comprise a notification that causes at least one of the one or more virtual machines to be restarted or terminated. The emulated memory error may comprise context information associated with the uncorrectable memory error including one or more of a location, a type, or a severity. A virtual machine managing manager may comprise a hypervisor.

In accordance with the method, signaling may comprise a BIOS of the host machine forwarding information associated with the uncorrectable memory error to an operating system of the host machine. Further still, the method may comprise the operating system of the host machine forwarding the information associated with the uncorrectable memory error to the virtual machine manager.

Additionally, in accordance with the method, introducing may comprise the virtual machine manager injecting the emulated memory error into a process of a virtual central processing unit of the at least one virtual machine. Further still, determining the one or more virtual machines associated with the corrupted memory element may comprise identifying at least one memory page associated with the corrupted memory element.

Aspects of the disclosed technology may also comprise a cloud computing system. The system may comprise a host machine capable of supporting one or more virtual machines, and one or more processing devices coupled to a memory containing instructions. The instructions may cause the one or more processors to: receive signaling from the host machine, the signaling indicating an uncorrectable memory error; determine, from among the one or more virtual machines, a virtual machine associated with a corrupted memory element based on the received signaling; and emulate a memory error associated with the corrupted memory element based on the uncorrectable memory error. The instructions may also cause the one or more processing devices to inject the emulated memory error into an operating environment of a virtual machine associated with the corrupted memory element.

The instructions may also cause the one or more processing devices to inject the emulated memory error causing the one or more processing devices to inject an interrupt that is accepted by a virtual central processing unit (vCPU) of the virtual machine associated with the corrupted memory element.

Further, the emulated memory error may comprise a notification that causes the virtual machine associated with the corrupted memory element to signal the uncorrectable memory error to a guest user space. The emulated memory error may comprise a notification that causes the virtual machine associated with the corrupted memory element to be restarted or terminated. In addition, a BIOS of the host machine may be configured to forward information associated with the uncorrectable memory error to an operating system of the host machine. The operating system of the host machine may forward the information associated with the uncorrectable memory error to the one or more processing devices.

Further aspects of the system may comprise the emulated memory error containing context information associated with the uncorrectable memory error including one or more of a location, a type, or a severity. Furthermore, the operating system of the host machine may forward the information associated with the uncorrectable memory error to the one or more processing devices. The one or more processing devices may comprise a hypervisor. In addition, the instructions may comprise that to determine the signaling indicating an uncorrectable memory error comprises identifying at least one memory page associated with the corrupted memory element.

Additional aspects of the disclosed technology may comprise one or more non-transitory computer readable media having stored thereon instructions that cause one or more processing devices to perform a process or method for uncorrectable memory error recovery in a cloud computing environment comprising receiving, at a virtual machine managing manager, signaling of an uncorrectable memory error detected by a host machine; determining, at the virtual machine managing manager, one or more virtual machines associated with a corrupted memory element based on the received signaling; emulating a memory error associated with the corrupted memory element based on the uncorrectable memory error; and introducing, by the virtual machine managing manager, the emulated memory error into an operating environment of at least one of the one or more virtual machines. The instructions may comprise one or more other method or process steps of the disclosed technology.

DETAILED DESCRIPTION

Overview

Memory errors are generally classified as correctable and uncorrectable. Correctable errors typically do not affect normal operation of a host machine, and thus a host computing system, in a cloud environment. Uncorrectable errors are typically fatal to the entire host computing system, causing, for example, the host machine to crash or shut down. In a cloud based virtual machine environment, this implies that all virtual machines (VMs) supported by a host machine will crash or shutdown with the host, leaving no clue or little chance of recovery to the VMs/user(s). The impact of uncorrectable memory errors in a modern cloud computing system is typically significant, as these systems often times employ relatively large sized memories per host, e.g., a cloud computing engine may enable a single VM with as much as 12 terabytes of memory. These larger hosts typically experience a higher rate of uncorrectable memory errors than smaller hosts, e.g., more memory translates into more memory errors. Downtime due to memory errors is typically very costly.

An aspect of the disclosed technology comprises a cloud computing infrastructure that allows a host and its associated VM(s) to stay up and/or recover from memory errors, including uncorrectable memory errors, as well as localize and contain the memory errors so that they do not impact other parts of the system, such as guest VM(s) workloads. For instance, the disclosed technology comprises configuring a host machine BIOS (including the associated memory elements) to enable error signaling recoverable at an operating system (OS), enhancing and enabling the OS's recovery path upon detection of memory errors on memory pages. An example of the disclosed technology comprises a central processing unit (CPU) capability that can signal an operating system (OS) with context information associated with memory errors (e.g., address, severity, whether signaled in isolation such that the error is recoverable, etc.). Such a mechanism may, for example, comprise Intel's x86 machine check architecture, in which the CPU reports hardware errors to the OS. A machine check exception (MCE) handler in the OS's kernel, such as provided via Linux for example, may then use an application programming interface (API) such as POSIX to signal the user space software application that triggered the MCE of the errors existence. The user space application may be made MCE resilient by providing data redundancy (e.g., a tiered caching model such as persistent storage then memory); native sharding of a local working set of data to minimize lost amount of work; or making the user application as stateless as practicable such that it can restart without losing work.

An aspect of the disclosed technology comprises a cloud computing system or architecture in which a mechanism is provided so that a virtual machine manager or hypervisor includes a capability to be alerted by a host machine of memory errors, particularly uncorrectable memory errors. The hypervisor, upon being alerted, processes the memory error information it receives from the host machine to determine VMs that may be accessing the corrupted memory element identifiable from the memory error information included in the alert. The hypervisor, upon identifying affected VMs, notifies them via their respective guest OSs of the memory error by, for example, providing a memory page that flags virtual memory locations or logical addresses that are mapped to the physical memory location or physical addresses of the corrupted memory element. The guest OSs and VMs may then avoid using the affected logical addresses by moving the instance(s) running on the VMs to other VMs, including the user shutting down those VMs and issuing a command/request for replacement VMs. Further, the hypervisor may now avoid that corrupted memory element for new VMs requests that may be assigned to the affected host machine. In addition, for uncorrectable memory errors, the hypervisor may initiate processes to failover VMs running on the affected host machine so that the host machine may ultimately be repaired.

As may be appreciated, a cloud computing system or architecture implemented in accordance with the foregoing mechanism can contain and allow for graceful recovery from uncorrectable memory errors. Specifically, by identifying the affecting memory, an hypervisor can limit or eliminate use (e.g., reads or accesses) of such memory prospectively. In addition, the hypervisor can limit the impact to only the affected VM. In addition, the hypervisor may initiate failover of the affected VM, and then manage moving unaffected VMs supported by the corrupted host to another host, to allow the corrupted host to be repaired. In this way, a customer's or user's exposure to the impact of uncorrectable memory errors may be limited to only affected VMs whose virtual memory is linked to the corrupted physical memory element or address, while unassociated VMs are kept unaware of the error and suffer no impact from it.

For instance, in applications where re-starting the application or VM is not enough, e.g., large database applications, corrupted data may be isolated and swapped out. In webservice type applications, aspects of the disclosed technology allow all the unaffected VMs to stay alive and keep running, while only the affected VM is restarted. In GPU or TPU clusters, a similar advantage may be realized, since only VMs or the application affected by the memory error need to be restarted.

When an uncorrectable error is signaled, normally permanent data corruption has already happened in memory. Under certain circumstances, it may still be possible to recover from even those errors. For instance, recovery may be possible if the corrupted cache line/page falls within a certain condition. Specifically, recovery may be possible where the content of the affected memory page can be reconstructed from persistent storage, e.g., a SAP HANA in-memory database. Recovery may also be possible if the affected process is a non-critical user space process, in which case it may be acceptable to poison and discard the corrupted page and restart the process without affecting the main jobs on the VM. As another example, recovery may be possible where the main serving jobs on the VM can survive restarts. This may be true for many use cases. In that regard, users usually prefer restarts to abruptly losing the VM host, e.g., in a distributed training workload, a worker restart with training continuing from the last saved checkpoint is less intrusive than losing a machine entirely for an extended period of time, thereby rendering the entire pod used for the training workload unusable. On the other hand, in instances where recovery is not possible for the affected VM, keeping the rest of the VMs on the host alive reduces the blast radius of the memory error significantly. Aspects of the disclosed technology may make recovery and containment from uncorrectable memory errors feasible.

Example Systems

Figure 1:
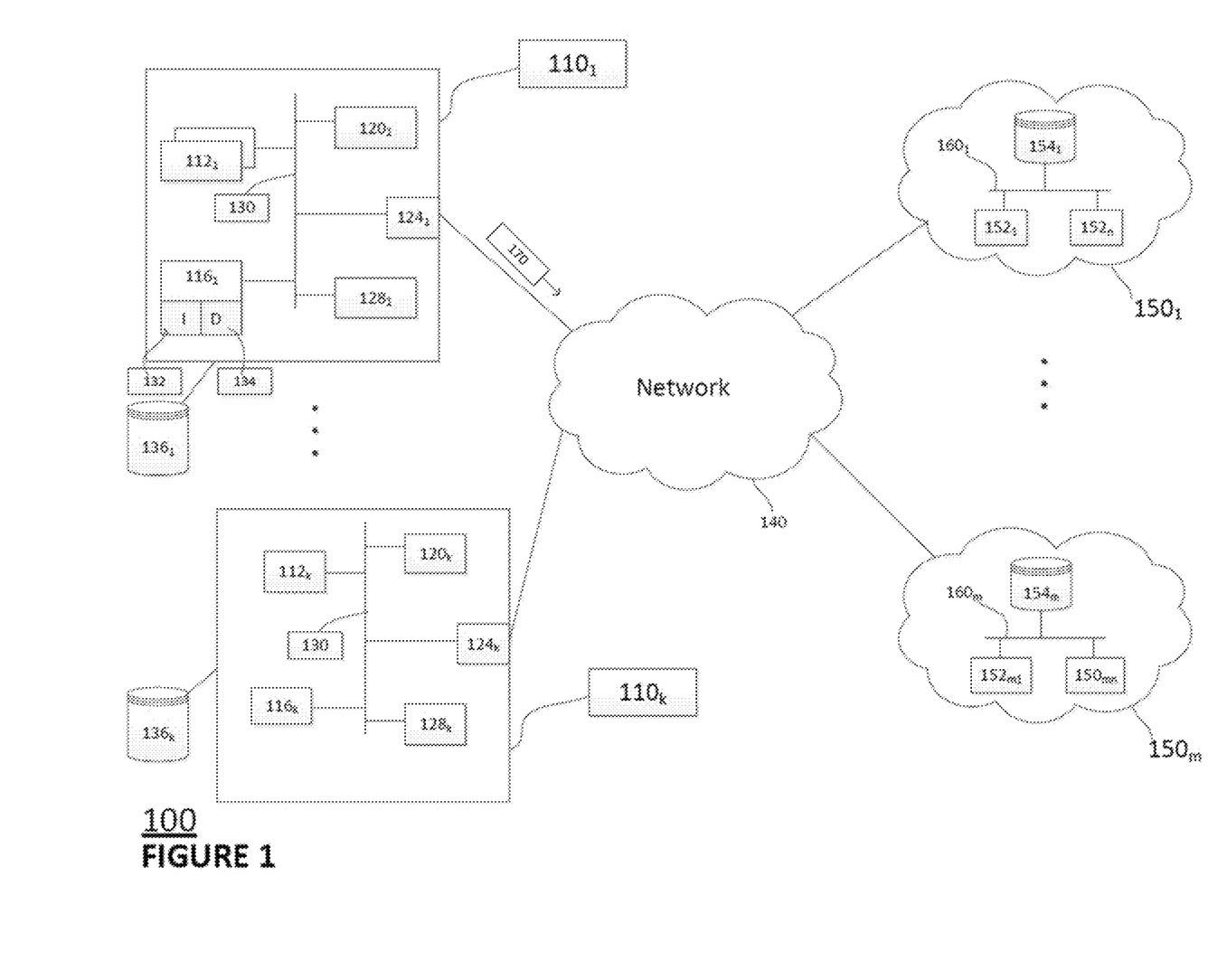
FIG. 1 illustratively depicts a block diagram of an example system or environment in accordance with aspects of the disclosed technology.

FIG. 1 is an example system 100 in accordance with aspects of the disclosure. System 100 includes one or more computing devices 110, which may comprise computing devices $110_1$ through $110_k$, a network 140 and one or more cloud computing systems 150, which may comprise cloud computing systems $150_1$ through $150_m$. Computing devices 110 may comprise computing devices located at customer locations that make use of cloud computing services such as Infrastructure as a Service (IaaS), Platform as a Service (PaaS), and/or Software as a Service (SaaS). For example, if a computing device 110 is located at a business enterprise, computing device 110 may use cloud systems 150 as a service that provides software applications (e.g., accounting, word processing, inventory tracking, etc. applications) to computing devices 110 used in operating enterprise systems. As an alternative example, computing device 110 may lease infrastructure in the form of virtual machines on which software applications are run to support enterprise operations.

As shown in FIG. 1, each of computing devices 110 may include one or more processors 112, memory 116 storing data (D) and instructions (I), display 120, communication interface 124, and input system 128, which are shown as interconnected via network 130. Computing device 110 may also be coupled or connected to storage 136, which may comprise local or remote storage, e.g., on a Storage Area Network (SAN), that stores data accumulated as part of a customer's operation. Computing device 110 may comprise a standalone computer (e.g., desktop or laptop) or a server associated with a customer. A given customer may also implement as part of its business multiple computing devices as servers. If a standalone computer, network 130 may comprise data buses, etc., internal to a computer; if a server, network 130 may comprise one or more of a local area network, virtual private network, wide area network, or other types of networks described below in relation to network 140. Memory 116 stores information accessible by the one or more processors 112, including instructions 132 and data 134 that may be executed or otherwise used by the processor(s) 112. The memory 116 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Processes, functions, methods, and routines of the instructions are explained in more detail below.

The data 134 may be retrieved, stored, or modified by processor 112 in accordance with the instructions 132. As an example, data 134 associated with memory 116 may comprise data used in supporting services for one or more client devices, an application, etc. Such data may include data to support hosting web-based applications, file share services, communication services, gaming, sharing video or audio files, or any other network based services.

The one or more processors 112 may be any conventional processor, such as commercially available CPUs. Alternatively, the one or more processors may be a dedicated device such as an ASIC or other hardware-based processor. Although FIG. 1 functionally illustrates the processor, memory, and other elements of computing device 110 as being within a single block, it will be understood by those of ordinary skill in the art that the processor, computing device, or memory may actually include multiple processors, computing devices, or memories that may or may not be located or stored within the same physical housing. In one example, one or more computing devices 110 may include one or more server computing devices having a plurality of computing devices, e.g., a load balanced server farm, that exchange information with different nodes of a network for the purpose of receiving, processing, and transmitting the data to and from other computing devices as part of customer's business operation.

Computing device 110 may also include a display 120 (e.g., a monitor having a screen, a touch-screen, a projector, a television, or other device that is operable to display information) that provides a user interface that allows for controlling the computing device 110 and accessing user space applications and/or data associated VMs supported in one more cloud systems 150, e.g., on a host in a cloud system 150. Such control may include, for example, using a computing device to cause data to be uploaded through input system 128 to cloud system 150 for processing, cause accumulation of data on storage 136, or more generally, manage different aspects of a customer's computing system. In some examples, computing device 110 may also access an API that allows it to specify workloads or jobs that run on VMs in the cloud as part of IaaS or SaaS. While input system 128 may be used to upload data, e.g., a USB port, computing device 110 may also include a mouse, keyboard, touch-screen, or microphone that can be used to receive commands and/or data.

The network 140 may include various configurations and protocols including short range communication protocols such as Bluetooth™, Bluetooth™ LE, the Internet, World Wide Web, intranets, virtual private networks, wide area networks, local networks, private networks using communication protocols proprietary to one or more companies, Ethernet, WiFi, HTTP, etc. and various combinations of the foregoing. Such communication may be facilitated by any device capable of transmitting data to and from other computing devices, such as modems and wireless interfaces. Computing device interfaces with network 140 through communication interface 124, which may include the hardware, drivers, and software necessary to support a given communications protocol.

Cloud computing systems 150 may comprise one or more data centers that may be linked via high speed communications or computing networks. A given data center within system 150 may comprise dedicated space within a building that houses computing systems and their associated components, e.g., storage systems and communication systems. Typically, a data center will include racks of communication equipment, servers/hosts, and disks. The servers/hosts and disks comprise physical computing resources that are used to provide virtual computing resources such as VMs. To the extent a given cloud computing system includes more than one data center, those data centers may be at different geographic locations within relatively close proximity to each other, chosen to deliver services in a timely and economically efficient manner, as well provide redundancy and maintain high availability. Similarly, different cloud computing systems are typically provided at different geographic locations.

As shown in FIG. 1, computing system 150 may be illustrated as comprising host machines 152, storage 154, and infrastructure 160. Host machines 152, storage 154, and infrastructure 160 may comprise a data center within a cloud computing system 150. Infrastructure 160 may comprise switches, physical links (e.g., fiber), and other equipment used to interconnect host machines within a data center with storage 154. Storage 154 may comprise a disk or other storage device that is partitionable to provide physical or virtual storage to virtual machines running on processing devices within a data center. Storage 154 may be provided as a SAN within the datacenter hosting the virtual machines supported by storage 154 or in a different data center that does not share a physical location with the virtual machines it supports. One or more hosts or other computer systems within a given data center may be configured to act as a supervisory agent or hypervisor in creating and managing virtual machines associated with one or more host machines in a given data center. In general, a host or computer system configured to function as a hypervisor will contain the instructions necessary to, for example, manage the operations that result from providing IaaS, PaaS, or SaaS to customers or users as a result of requests for services originating at, for example, computing devices 110.

Figure 2:
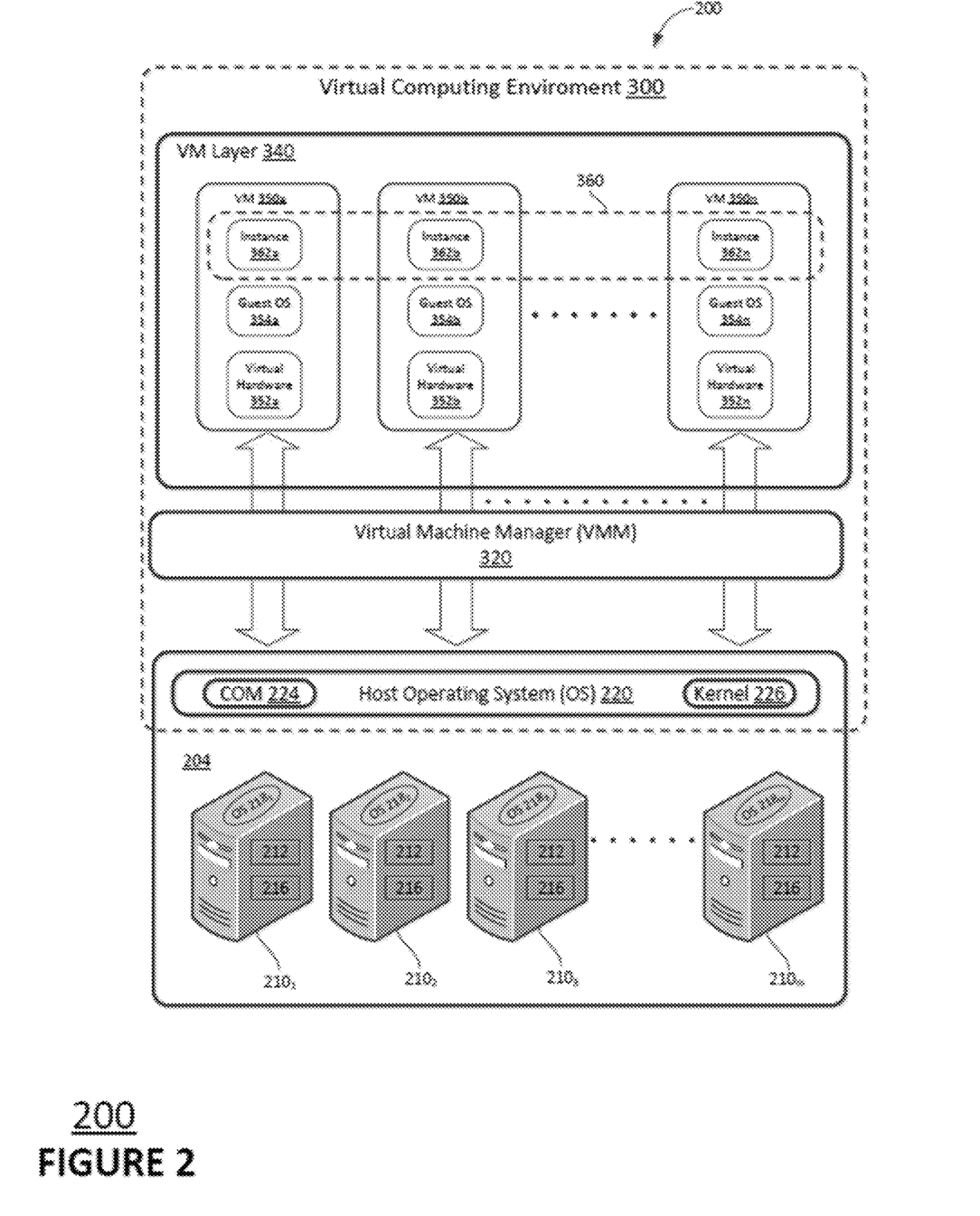
FIG. 2 illustratively depicts a block diagram of an example system or environment in accordance with aspects of the disclosed technology.

In the example shown in FIG. 2, a distributed system 200, such as that shown in relation to cloud systems 150 of FIG. 1, includes a collection 204 of host machines 210 (e.g., hardware resources 210) supporting or executing the virtual computing environment 300. The virtual computing environment 300 includes a virtual machine manager (VMM) 320 and a virtual machine (VM) layer 340 running one or more virtual machines (VMs) 350a-n configured to execute instances 362a, 362a-n of one or more software applications 360. Each host machine 210 may include one or more physical central processing units (pCPU) 212 ("data processing hardware 212") and associated memory hardware 216. While each hardware resource or host 210 is shown having a single physical processor 212, any hardware resource 210 may include multiple physical processors 212. Hosts 210 also include physical memory 216, which may be partitioned by host operating system (OS) 220 into virtual memory and assigned for use by VMs 350 in the VM layer 340, or even the VMM 320 or host OS 220. Physical memory 216 may comprise random access memory (RAM) and/or disk storage (including storage 154 accessible via infrastructure 160 as shown in FIG. 1).

Host operating system (OS) 220 may execute on a given one of the host machines 210 or may be configured to operate across a collection, including a plurality, of the host machines 210. For convenience, FIG. 2 shows the host OS 220 as operating across the collection of machines $210_1$ through $210_m$. Further, while the host OS 220 is illustrated as being part of the virtual computing environment 300, each host machine 210 is equipped with its own OS 218. However, from the perspective of a virtual environment, the OS on each machine appears as and is managed as a collective OS 220 to a VMM 320 and VM layer 340.

In some examples, the VMM 320 corresponds to a hypervisor 320 (e.g., a Compute Engine) that includes at least one of software, firmware, or hardware configured to create, instantiate/deploy, and execute the VMs 350. A computer, such as data processing hardware 212, associated with the VMM 320 that executes the one or more VMs 350 is typically referred to as a host machine 210 (as used above), while each VM 350 may be referred to as a guest machine. Here, the VMM 320 or hypervisor is configured to provide each VM 350 a corresponding guest operating system (OS) 354, e.g., 354a-n, having a virtual operating platform and manages execution of the corresponding guest OS 354 on the VM 350. As used herein, each VM 350 may be referred to as an "instance" or a "VM instance." In some examples, multiple instances of a variety of operating systems may share virtualized resources. For instance, a first VM 350 of the Linux® operating system, a second VM 350 of the Windows® operating system, and a third VM 350 of the OS X® operating system may all run on a single physical x86 machine.

The VM layer 340 includes one or more virtual machines 350. The distributed system 200 enables a user (through one more computing devices 110) to launch VMs 350 on demand, i.e., by sending a command or request 170 (FIG. 1) to the distributed system 200 (comprising a cloud system 150) via the network 140. For instance, the command/request 170 may include an image or snapshot associated with the corresponding operating system 220 and the distributed system 200 may use the image or snapshot to create a root resource 210 for the corresponding VM 350. Here, the image or snapshot within the command/request 170 may include a boot loader, the corresponding operating system 220, and a root file system. In response to receiving the command/request 170, the distributed system 200 may instantiate the corresponding VM 350 and automatically start the VM 350 upon instantiation.

A VM 350 emulates a real computer system (e.g., host machine 210) and operates based on the computer architecture and functions of the real computer system or a hypothetical computer system, which may involve specialized hardware, software, or a combination thereof. In some examples, the distributed system 200 authorizes and authenticates the user device 110 before launching the one or more VMs 350. An instance 362 of a software application 360, or simply an instance, refers to a VM 350 hosted on (executing on) the data processing hardware 212 of the distributed system 200.

The host OS 220 virtualizes underlying host machine hardware and manages concurrent execution of one or more VM instances 350. For instance, host OS 220 may manage VM instances 350a-n and each VM instance 350 may include a simulated version of the underlying host machine hardware, or a different computer architecture. The simulated version of the hardware associated with each VM instance 350, 350a-n is referred to as virtual hardware 352, 352a-n. The virtual hardware 352 may include one or more virtual central processing units (vCPUs) ("virtual processor") emulating one or more physical processors 212 of a host machine 210. The virtual processor may be interchangeably referred to a "computing resource" associated with the VM instance 350. The computing resource may include a target computing resource level required for executing the corresponding individual service instance 362.

The virtual hardware 352 may further include virtual memory in communication with the virtual processor and storing guest instructions (e.g., guest software) executable by the virtual processor for performing operations. For instance, the virtual processor may execute instructions from the virtual memory that cause the virtual processor to execute a corresponding individual service instance 362 of the software application 360. Here, the individual service instance 362 may be referred to as a guest instance that cannot determine if it is being executed by the virtual hardware 352 or the physical data processing hardware 212. A host machine's microprocessor(s) can include processor-level mechanisms to enable virtual hardware 352 to execute software instances 362 of applications 360 efficiently by allowing guest software instructions to be executed directly on the host machine's microprocessor without requiring code-rewriting, recompilation, or instruction emulation. The virtual memory may be interchangeably referred to as a "memory resource" associated with the VM instance 350. The memory resource may include a target memory resource level required for executing the corresponding individual service instance 362.

The virtual hardware 352 may further include at least one virtual storage device that provides run time capacity for the service on the physical memory hardware 212. The at least one virtual storage device may be referred to as a storage resource associated with the VM instance 350. The storage resource may include a target storage resource level required for executing the corresponding individual service instance 362. The guest software executing on each VM instance 350 may further assign network boundaries (e.g., allocate network addresses) through which respective guest software can communicate with other processes reachable through an internal network 160 (FIG. 1), the external network 140 (FIG. 1), or both. The network boundaries may be referred to as a network resource associated with the VM instance 350.

The guest OS 354 executing on each VM 350 includes software that controls the execution of the corresponding individual service instance 362, e.g., one or more of 362a-n of the application 360 by the VM instance 350. The guest OS 354, 354a-n executing on a VM instance 350, 350a-n can be the same or different as the other guest OS 354 executing on the other VM instances 350. In some implementations, a VM instance 350 does not require a guest OS 354 in order to execute the individual service instance 362. The host OS 220 may further include virtual memory reserved for a kernel 226 of the host OS 220. The kernel 226 may include kernel extensions and device drivers, and may perform certain privileged operations that are off limits to processes running in a user process space of the host OS 220. Examples of privileged operations include access to different address spaces, access to special functional processor units in the host machine 210 such as memory management units, and so on. A communication process 224 running on the host OS 220 may provide a portion of VM network communication functionality and may execute in the user process space or a kernel process space associated with the kernel 226.

In accordance with aspects of the disclosed technology, unrecoverable memory errors, for example bit flips, that occur on a host machine 210 that implements MCE may be managed at the hypervisor layer to mitigate and/or avoid affected guest VMs crashing and contain the impact of unrecoverable memory error to only affected guest VMs. For example, the BIOS associated with a given host machine 210 is configured so that MCEs generated by pCPU 212 on the host are sent to kernel 226. The MCE includes context information about the error including, for example, the physical memory address, the severity of the error, whether the error is an isolated error, a component within a pCPU where the error was signaled from, etc. Kernel 226 relays the error to the hypervisor 320. Hypervisor 320 then processes that information to identify the virtual memories associated with the error and identifies any affected memory pages, as well as associated VMs. As VMs typically do not share virtual memory, a given memory error may be isolated to a given VM. Therefore, there is little to no risk of propagating the error beyond the affected VM(s). Hypervisor 320 then isolates the corrupted memory page to avoid the guest OS from accessing it. Next, the hypervisor informs the affected guest OS of the error by emulating the error. Specifically, the hypervisor injects an interrupt, e.g., interrupt 80, to the guest OS, which informs the guest OS of the error. In this way, for example, only a VM affected by the error is notified of the error and only that VM or the application associated with that VM may be restarted.

In addition, having been notified of corrupted virtual memory addresses or a memory page containing such addresses, the affected VM may avoid reading from or accessing those memory locations, which results in containment of the error. For example, each memory read or access of a corrupted memory element generates an MCE. An aspect of disclosed technology mitigates and/or avoids causing multiple reads or accessing of corrupted memory elements after it's detected at the host level and the VMM and/or guest OS are notified of the error.

In other examples, a user application may be running across multiple virtual machines, and a memory error associated with a single VM may impact multiple VMs (e.g., a machine learning training job). In such examples, the impact of the error may require that more than one VM be notified of the error. For instance, if the hypervisor had distributed a given job or jobs among more than one VM, the hypervisor may then broadcast the error to all affected VMs. In this instance, the user may decide that shutting down and restarting the affected application is the viable option. In contrast, where a single VM is involved, keeping the VM alive by, for example, providing it with a new memory page, or restarting it may be a viable option.

Example Processes or Methods

Figure 3:
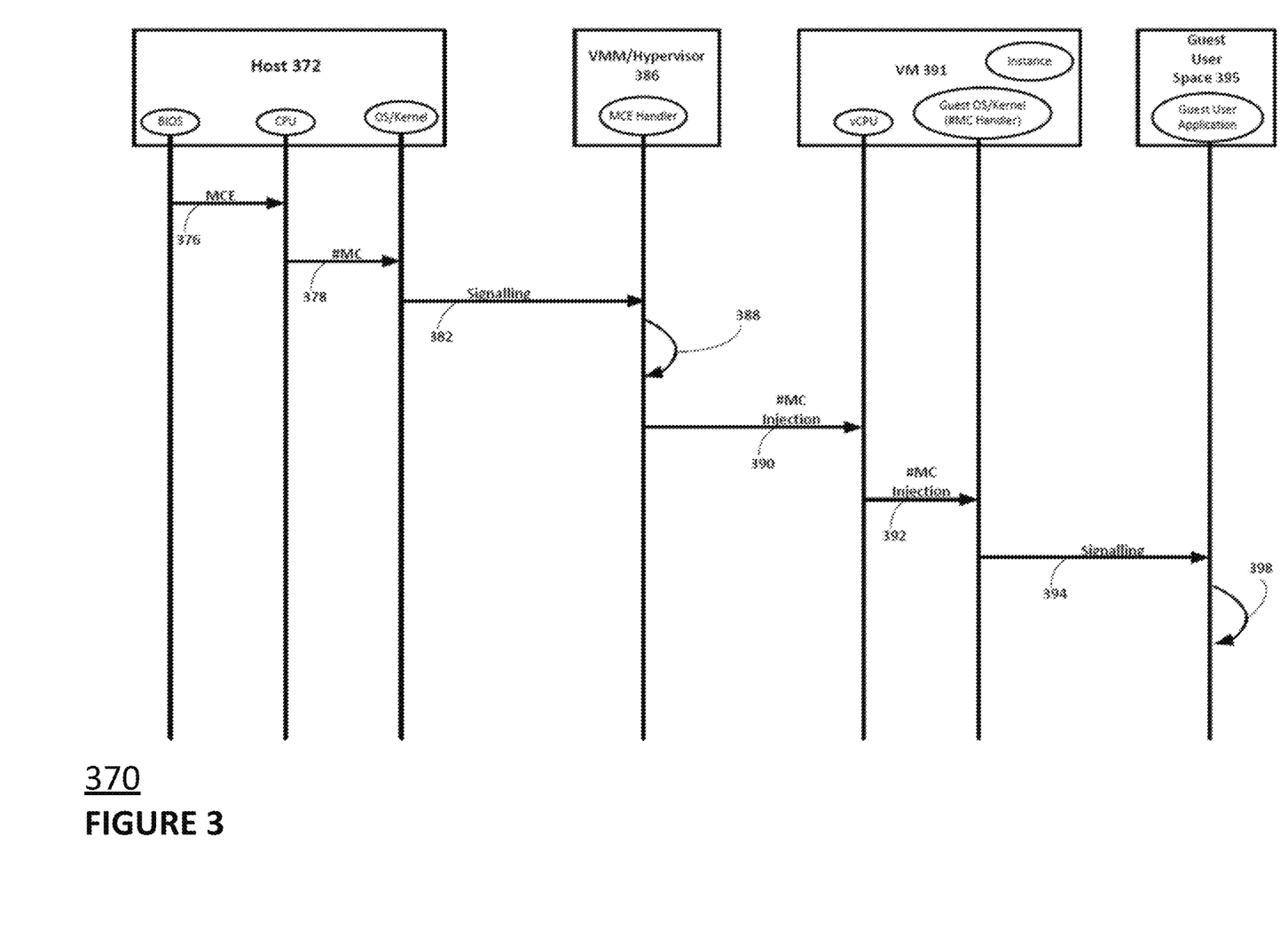
FIG. 3 illustratively depicts a flow or swim diagram of an example process or method in accordance with aspects of the disclosed technology.

An example of a processing flow or method 370 in accordance with aspects of the disclosed technology is shown in FIG. 3. Host 372 includes a BIOS, CPU, and a kernel (as part of its OS). The host is configured to detect uncorrectable memory errors and issue machine check exceptions (MCE) in response to such detection. In addition, a capability to classify detected uncorrectable memory errors is also provided. For example, the classification may include where the error is discovered, whether it is recoverable or not, and what type of recovery is allowed or necessary. For instance, some hardware architectures relay context information that signals software that recovery is not possible and therefore the kernel needs to enter panic mode. A typical example where that occurs is when execution context is corrupted (e.g., error occurs in the middle of a CPU executing certain instructions). When an uncorrectable memory error is detected in host 372, the BIOS sends an MCE to the CPU, line 376.

The CPU then relays the MCE information (depicted as #MC) to the kernel of host 372, line 378. #MC and MCE, or MCE information, may comprise the same context information or the same type of context information. A handler (e.g., MCE or #MC Handler) within the kernel receives the MCE information (#MC) as to the uncorrectable memory event, including context information, and signals (line 382) an MCE signal handler in hypervisor 386. Signaling may occur via a bus error signal (e.g., SIGBUS). Hypervisor 386 decodes the MCE information and maps it to the virtual memory space associated with the VMs supported by the affected host, line 388. In doing so, hypervisor 386 determines the virtual memory and memory page associated with the corrupted memory element. In addition, the hypervisor 386 emulates the MCE event, line 388. That is, the hypervisor 386 translates the context information associated with the physical memory error into context information associated with the virtual memory location. The hypervisor then provides error emulation by injecting the MCE information (#MC injection) into the affected VM environment, line 390. Specifically, the hypervisor initiates an interrupt to the vCPU and provides the #MC injection to the vCPU.

The vCPU then forwards the #MC injection to the guest OS running on the VM 391, line 392. A handler within the guest kernel of the guest OS, in response to receipt of the #MC injection for example, issues a bus error signal to the guest user space (e.g., the guest user space application), line 394. Injecting the #MC or MCE information into guest OS and/or #MC Handler in the guest kernel signalling the guest user space 395 has the effect of keeping the VM instance alive. The guest user application may then decide to continue running by recovering from the memory error signaled, shutting down the affected VM, or restarting the VM instance, line 398. Possible recovery actions may include remapping and reloading the affected memory page or restarting the guest user space program. For example, if the content of the corrupted memory element can be reconstructed from storage, a new memory page may be remapped and reloaded, and the instance or application may continue to run or be kept alive. Alternatively, if the application can survive a restart, then that course of action may be undertaken. In some circumstances, depending on the error, live migration of the VMs residing on the host may be necessary, but even here this can be handled more gracefully as compared to an abrupt shutdown of the host.

As indicated from the foregoing, aspects of the disclosed technology include having a MCE handler of a host kernel signal all the relevant MCE details to a virtual machine manager or hypervisor. With the hypervisor, a MCE SIGBUS handler records memory error events in, for instance, a VmEvents table. The events table may include a field that records the following details: regular VM metadata (e.g., VM id, project id; MCE details: DIMM, rank, bank, MCA registers from all relevant banks). Optionally, neighbor information may also be recorded, e.g., which other VMs are on the host, on the same socket, etc. Neighbor information may be important in analyzing potential security attacks, such as for example a Row Hammer attack. In such an example, the disclosed technology may notify the guest user space of all the affected VMs and cause initiation of more graceful failover to another host.

Memory error containment and memory error recovery is enabled in the BIOS, along with 110 stop and scream. Error signaling via a specific new MSI/NMI handler is added to the host kernel with the behavior of just panic to the host. The host kernel is configured to know which address space the MCE error belongs to and if the process is a VM.

Figure 4:
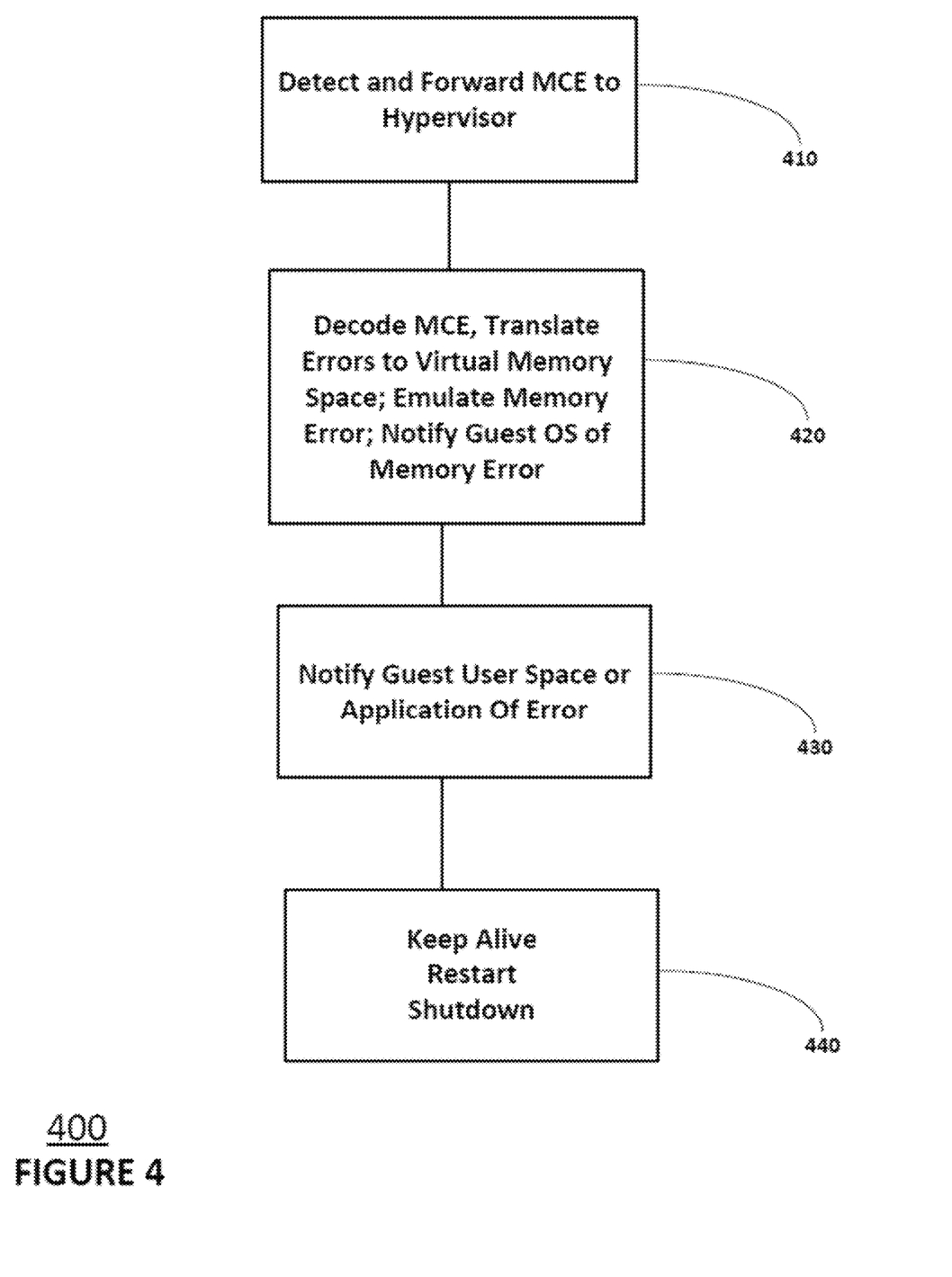
FIG. 4 depicts a flow diagram of an example process or method in accordance with aspects of the disclosed technology.

FIG. 4 illustrates a method or process 400 in accordance with aspects of the disclosed technology. As shown, the method includes detecting and forwarding MCE relating to uncorrectable memory errors to a virtual machine manager or hypervisor, block 410. The MCE information is decoded and mapped by the virtual machine manager or hypervisor to affected memory pages, and thus to the affected VM, block 420. The virtual machine manager or hypervisor then notifies the guest OS, which in turn notifies the guest space, block 430. At the guest user space, it may be determined to keep alive the affected VM instance or application, terminate the application, or restart the application, block 440. Further details regarding these operations have been described above.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including," and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for uncorrectable memory error recovery in a cloud computing environment, comprising:
   receiving, at a virtual machine managing manager, signaling of an uncorrectable memory error detected by a host machine;
   determining, at the virtual machine managing manager, one or more virtual machines associated with a corrupted memory element based on the received signaling;
   emulating a memory error associated with the corrupted memory element based on the uncorrectable memory error; and
   introducing, by the virtual machine managing manager, the emulated memory error into an operating environment of at least one of the one or more virtual machines, and
   wherein the emulated memory error comprises a notification that causes the at least one of the one or more virtual machines to signal the uncorrectable memory error to a guest user space.

2. The method of claim 1, wherein the introducing the emulated memory error comprises the virtual machine managing manager injecting an interrupt that is accepted by a virtual central processing unit (vCPU) of each of the one or more virtual machines.

3. The method of claim 1, wherein the emulated memory error comprises a notification that causes the at least one of the one or more virtual machines to be restarted or terminated.

4. The method of claim 1, wherein signaling comprises a BIOS of the host machine forwarding information associated with the uncorrectable memory error to an operating system of the host machine.

5. The method of claim 4, comprising the operating system of the host machine forwarding the information associated with the uncorrectable memory error to the virtual machine manager.

6. The method of claim 5, wherein introducing comprises the virtual machine manager injecting the emulated memory error into a process of a virtual central processing unit of the at least one virtual machine.

7. The method of claim 1, wherein the emulated memory error comprises context information associated with the uncorrectable memory error including one or more of a location, a type, or a severity.

8. The method of claim 1, wherein the virtual machine managing manager comprises a hypervisor.

9. The method of claim 1, wherein determining the one or more virtual machines associated with the corrupted memory element comprises identifying at least one memory page associated with the corrupted memory element.

10. The method of claim 1, wherein the emulated memory error comprises a notification that causes a guest operating system of the at least one of the one or more virtual machines to signal the uncorrectable memory error to a guest user space.

11. A cloud computing system, comprising:
a host machine capable of supporting one or more virtual machines; and
one or more processing devices coupled to a memory containing instructions, the instructions causing the one or more processing devices to:
receive signaling from the host machine, the signaling indicating an uncorrectable memory error;
determine, from among the one or more virtual machines, a virtual machine associated with a corrupted memory element based on the received signaling;
emulate a memory error associated with the corrupted memory element based on the uncorrectable memory error; and
inject the emulated memory error into an operating environment of the virtual machine associated with the corrupted memory element, and
wherein the emulated memory error comprises a notification that causes the virtual machine associated with the corrupted memory element to signal the uncorrectable memory error to a guest user space.

12. The cloud computing system of claim 11, wherein the instructions causing the one or more processing devices to inject the emulated memory error comprises causing the one or more processing devices to inject an interrupt that is accepted by a virtual central processing unit (vCPU) of the virtual machine associated with the corrupted memory element.

13. The cloud computing system of claim 11, wherein the emulated memory error comprises a notification that causes the virtual machine associated with the corrupted memory element to be restarted or terminated.

14. The cloud computing system of claim 11, wherein a BIOS of the host machine is configured to forward information associated with the uncorrectable memory error to an operating system of the host machine.

15. The cloud computing system of claim 14, comprising the operating system of the host machine forwarding the information associated with the uncorrectable memory error to the one or more processing devices.

16. The cloud computing system of claim 11, wherein the emulated memory error comprises context information associated with the uncorrectable memory error including one or more of a location, a type, or a severity.

17. The cloud computing system of claim 11, wherein the one or more processing devices comprises a hypervisor.

18. The cloud computing system of claim 11, wherein the instructions causing the one or more processing devices to determine comprises identifying at least one memory page associated with the corrupted memory element.

* * * * *